United States Patent
Fujiwara et al.

[11] Patent Number: 5,561,652
[45] Date of Patent: Oct. 1, 1996

[54] APPARATUS FOR RECORDING DATA ON OPTICAL DISK

[75] Inventors: Yasuhiro Fujiwara, Hamburg, Germany; Takuya Hase, Tokyo, Japan

[73] Assignee: Olympus Optical Co., Ltd., Tokyo, Japan

[21] Appl. No.: 242,741

[22] Filed: May 12, 1994

[30] Foreign Application Priority Data

May 14, 1993 [JP] Japan .................................. 5-113369
May 26, 1993 [JP] Japan .................................. 5-124422

[51] Int. Cl.$^6$ .................................. G11B 7/00
[52] U.S. Cl. .................. 369/59; 369/48; 369/50; 369/124
[58] Field of Search .................. 369/54, 58, 59, 369/60, 47, 48, 49, 50, 124, 32

[56] References Cited

U.S. PATENT DOCUMENTS 5,130,970  7/1992  Ohta .................................. 369/50 X
5,347,505  9/1994  Moritsugu et al. .................. 369/59

FOREIGN PATENT DOCUMENTS 59-24452  2/1984  Japan .

Primary Examiner—Georgia Y. Epps
Assistant Examiner—Muhammad N. Edun
Attorney, Agent, or Firm—Frishauf, Holtz, Goodman, Langer & Chick

[57] ABSTRACT

A magneto-optical disk recording apparatus of the ZCAV recording type in which tracks are divided in a plurality of zones in the radial direction, comprises a data pattern generator for generating a recording data pattern signal synchronous with a reference clock, a frequency multiplier circuit for multiplying the reference clock by two, an OR gate for outputting a logical sum signal of an output from the multiplier circuit and the reference clock, and a recording pulse generating circuit including an AND gate for turning on/off a recording data pattern using an output from the OR gate as a gate output. With this structure, a recording pulse having a pulse width of 0.75 T with respect to the cycle T of the reference clock is generated synchronous with the reference clock.

9 Claims, 13 Drawing Sheets

| ZONE | MIN. RADIUS (mm) | MAX. RADIUS (mm) | CLOCK (MHZ) | 1T (nsec) | 0.5T (nsec) | 0.75T (nsec) |
|---|---|---|---|---|---|---|
| 0 | 30.00 | 31.88 | 13.15 | 76.03 | 38.01 | 57.02 |
| 1 | 31.88 | 33.75 | 13.98 | 71.55 | 35.78 | 53.66 |
| 2 | 33.75 | 35.63 | 14.80 | 67.57 | 33.79 | 50.68 |
| 3 | 35.63 | 37.50 | 15.62 | 64.02 | 32.01 | 48.01 |
| 4 | 37.50 | 39.38 | 16.44 | 60.81 | 30.41 | 45.61 |
| 5 | 39.38 | 41.25 | 17.27 | 57.91 | 28.96 | 43.44 |
| 6 | 41.25 | 43.13 | 18.09 | 55.28 | 27.64 | 41.46 |
| 7 | 43.13 | 45.00 | 18.91 | 52.88 | 26.44 | 39.66 |
| 8 | 45.00 | 46.88 | 19.74 | 50.67 | 25.34 | 38.00 |
| 9 | 46.88 | 48.75 | 20.56 | 48.64 | 24.32 | 36.48 |
| 10 | 48.75 | 50.63 | 21.38 | 46.77 | 23.39 | 35.08 |
| 11 | 50.63 | 52.50 | 22.20 | 45.04 | 22.52 | 33.78 |
| 12 | 52.50 | 54.38 | 23.03 | 43.43 | 21.71 | 32.57 |
| 13 | 54.38 | 56.25 | 23.85 | 41.93 | 20.97 | 31.45 |
| 14 | 56.25 | 58.13 | 24.67 | 40.53 | 20.27 | 30.40 |
| 15 | 58.13 | 60.00 | 25.49 | 39.22 | 19.61 | 29.42 |

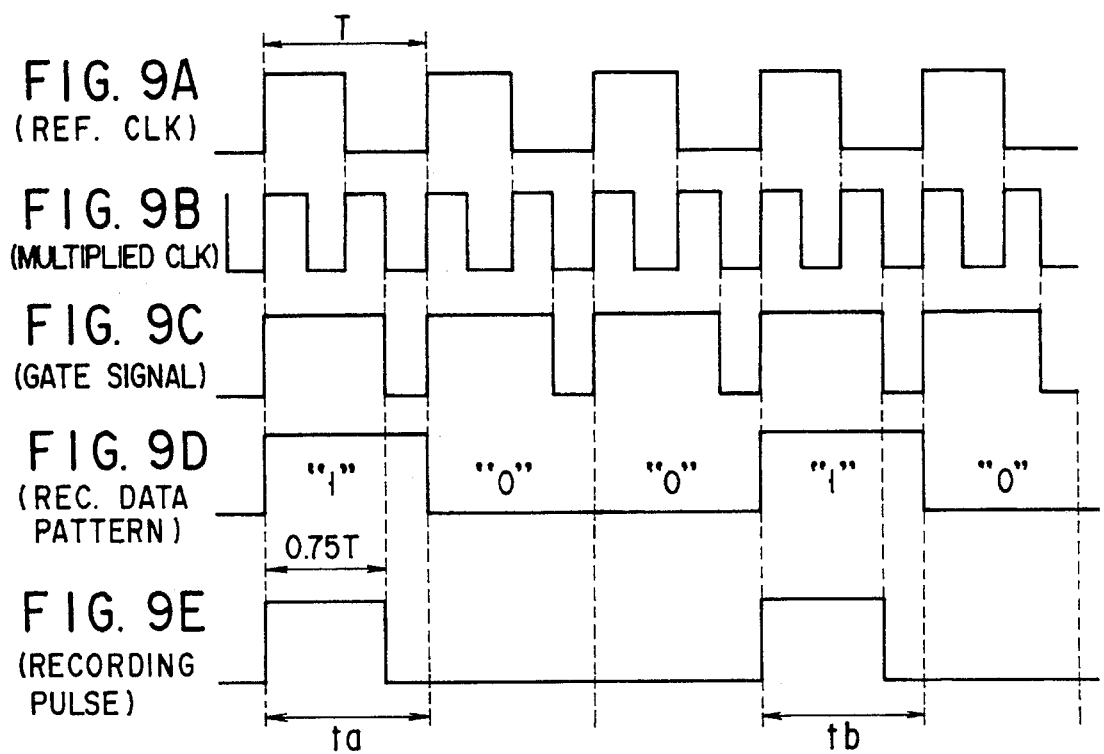
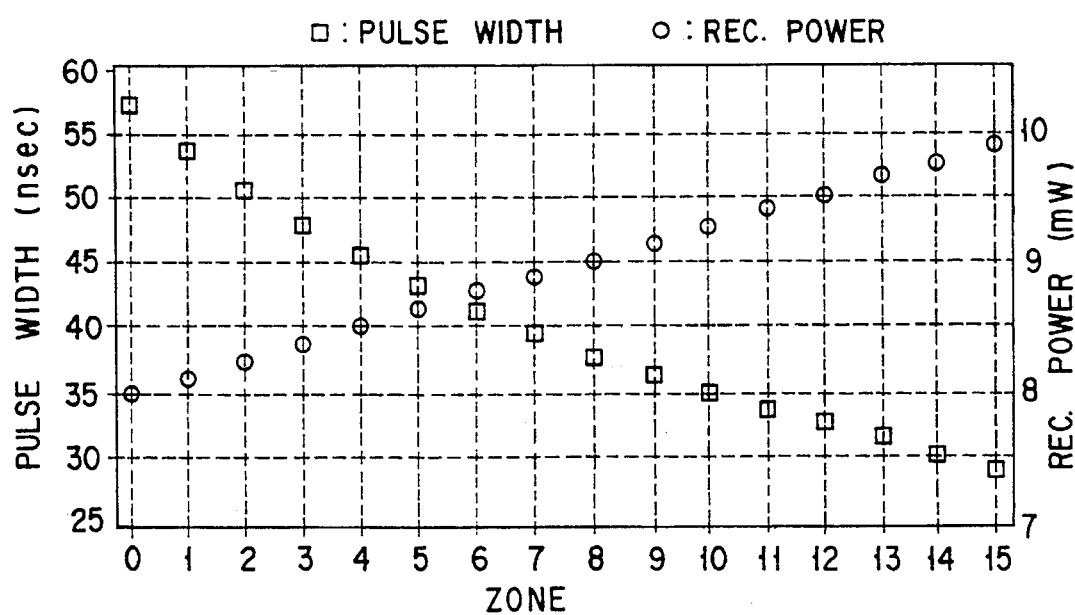
FIG. 10

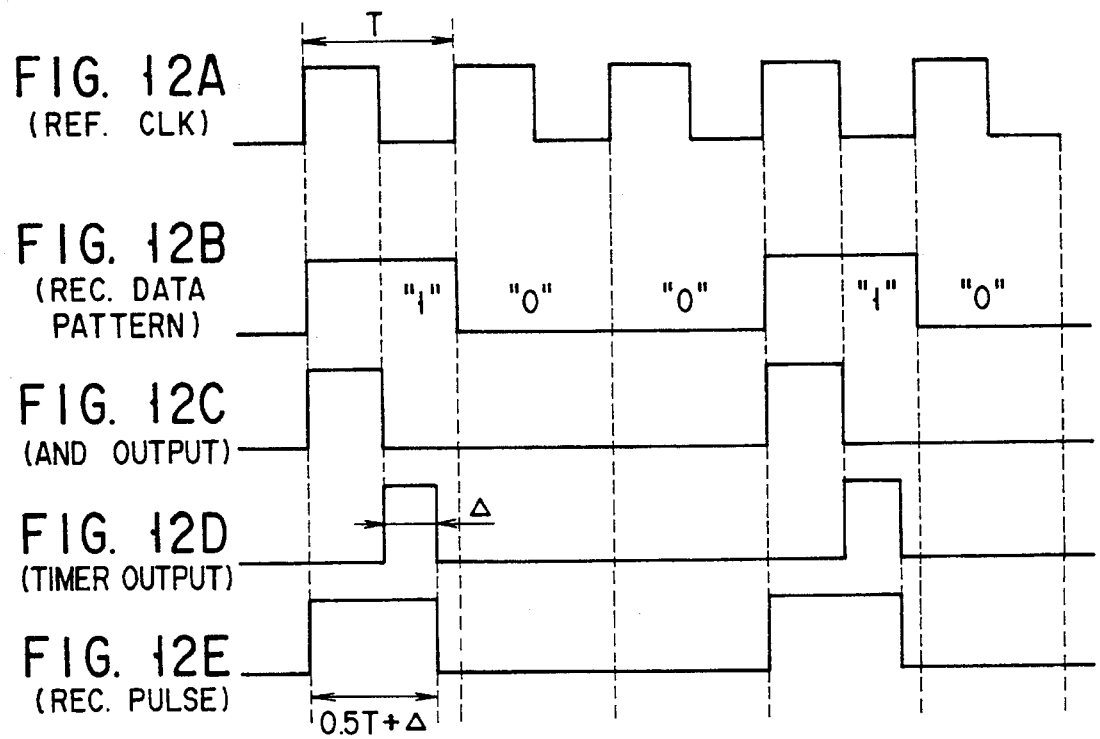
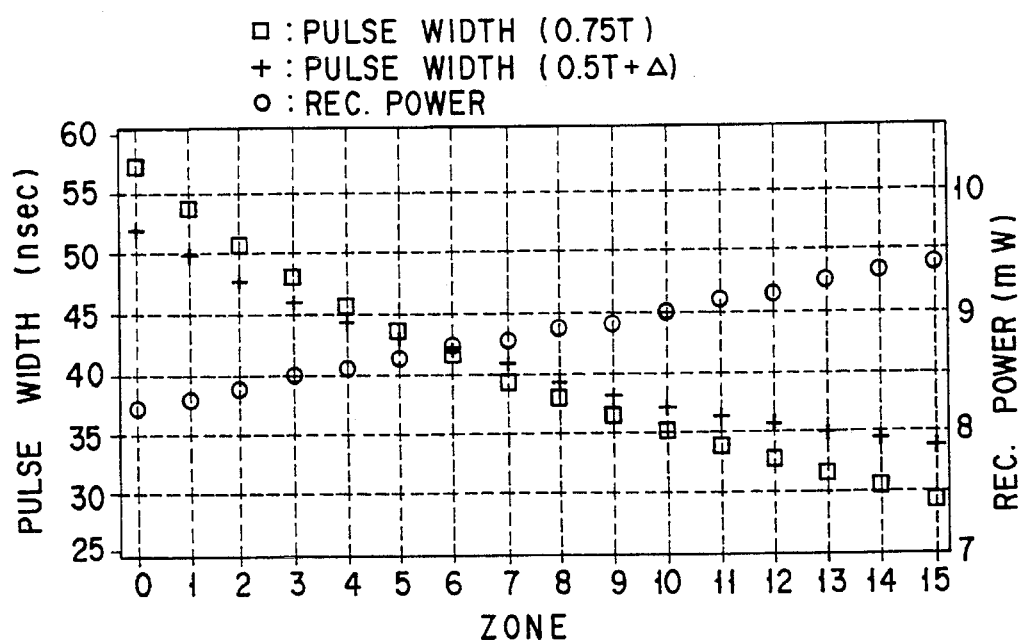
FIG. 13

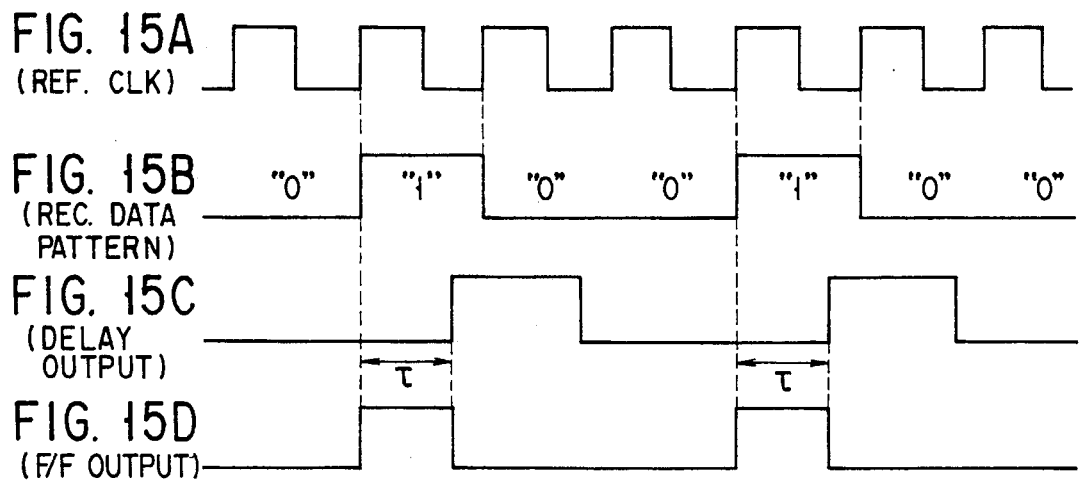
FIG. 15A (REF. CLK)
FIG. 15B (REC. DATA PATTERN)
FIG. 15C (DELAY OUTPUT)
FIG. 15D (F/F OUTPUT)
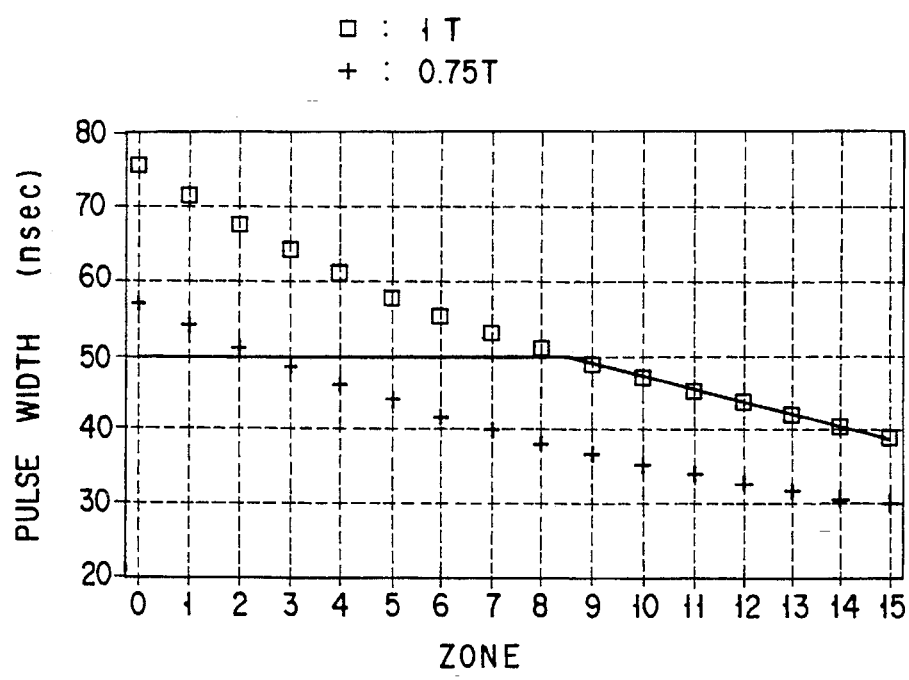
FIG. 16

| ZONE | CLOCK (MHZ) | 1T (nsec) | 0.75T (nsec) | PULSE WIDTH (nsec) |
|---|---|---|---|---|
| 0 | 21.922 | 45.617 | 34.213 | 34.213 |
| 1 | 23.293 | 42.931 | 32.198 | 32.198 |
| 2 | 24.665 | 40.543 | 30.407 | 30.407 |
| 3 | 26.035 | 38.410 | 28.807 | 28.807 |
| 4 | 27.407 | 36.487 | 27.366 | 27.366 |
| 5 | 28.778 | 34.748 | 26.061 | 26.061 |
| 6 | 30.150 | 33.167 | 24.876 | 25.000 |
| 7 | 31.520 | 31.726 | 23.794 | 25.000 |
| 8 | 32.892 | 30.403 | 22.802 | 25.000 |
| 9 | 34.263 | 29.186 | 21.889 | 25.000 |
| 10 | 35.635 | 28.062 | 21.047 | 25.000 |
| 11 | 37.005 | 27.023 | 20.268 | 25.000 |
| 12 | 38.378 | 26.058 | 19.543 | 24.543 |
| 13 | 39.748 | 25.158 | 18.869 | 23.869 |
| 14 | 41.118 | 24.320 | 18.240 | 23.240 |
| 15 | 42.490 | 23.535 | 17.651 | 22.651 |
F I G. 18
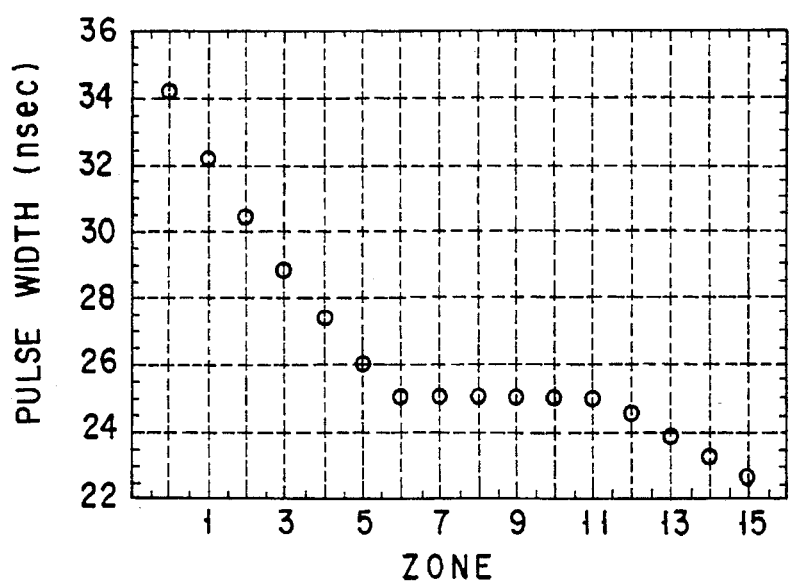
F I G. 19

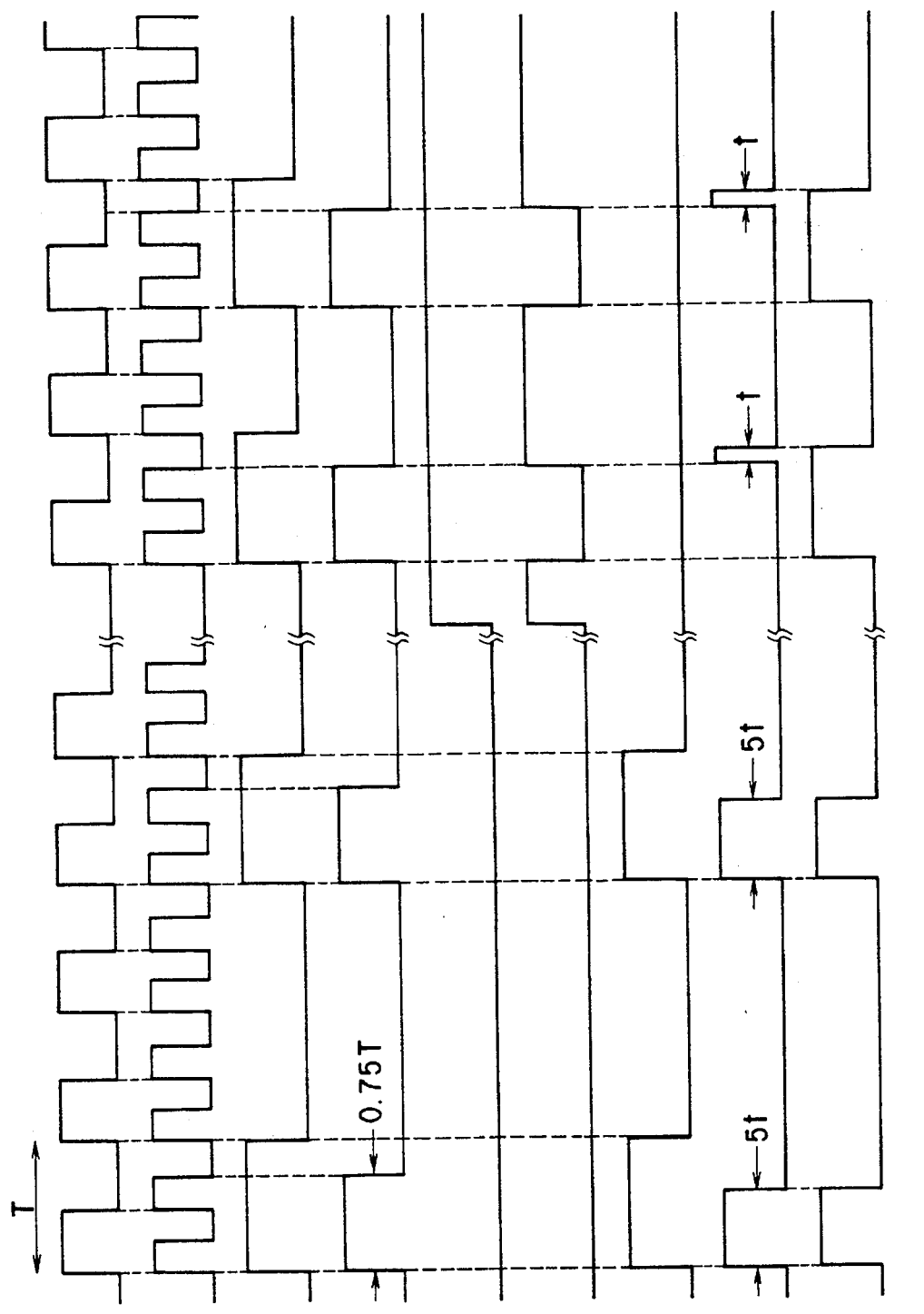

APPARATUS FOR RECORDING DATA ON OPTICAL DISK

BACKGROUND OF THE INVENTION

1. Field of the Invention

The present invention relates to an optical disk recording apparatus for recording data on a data-rewritable optical disk.

2. Description of the Related Art

Presently, a disk drive apparatus for recording/reproducing data on a magneto-optical disk having a diameter of 130 mm, which satisfies the ISO standard (ISO)/IEC10089) is commercially available. In the magneto-optical disk drive of this type, a concentrated laser beam is pulse-modulated while applying a constant magnetic field on the magnetic thin film of a magneto-optical disk, and a magnetization reversal domain (pit) is formed selectively on appropriate focalizing spots of the laser beam on the magnetic thin film, thus recording data.

FIG. 1 illustrates the concept of the data recording. As can be seen in this figure, a disk is formed of a transparent substrate 1 and a magnetic thin film 2 having a vertical magnetic anisotropy and formed on the transparent substrate 1. The magnetic thin film 2 initially has a magnetization directed downward as indicated by arrow A. When the power of a concentrated laser beam is increased to a high level pulsewise while applying an external magnetic filed directed upward as indicated by arrow B on the magnetic thin film 2, only the portion whose temperature has been increased by the laser irradiation, changes the direction of its magnetization to the same direction as that of the external magnetic field (indicated by arrow C), and a magnetization reversal domain 4 is formed. As the disk is rotated while the laser beam is applied pulsewise in accordance with the data to be recorded, more magnetization reversal domains 4 are formed successively on the magnetic thin film 2 in accordance with the recording data. Thus, the data is recorded.

As mentioned above, a magneto-optical recording is carried out by increasing the temperature of a magnetic thin film. Therefore, in order to achieve a high-quality recording, the wave height value of a laser of the pulse laser emission, or the pulse height (to be called recording power hereinafter), and the pulse width must be appropriately selected. Note that the pulse width has the same meaning as the duty of the pulse since the pulse emission of the laser is carried out synchronously with the clock-pulse.

FIG. 2 shows the recording power dependency of the error rate in the case where data is recorded, using laser beams having several different pulse widths, on the innermost track of a CAV (Constant Angular Velocity) disk which is in conformity to the ISO standard mentioned above. 1T, 0.75 T and 0.5 T are pulse widths used, and 1T is the pulse width which is equal to the period of the reference clock, so-called channel clock, for recording/reproduction of data. Accordingly, 0.75 T and 0.5 T respectively means ¾ and ½ of the 1T pulse width. The byte-error rate taken in the vertical axis is an error rate of data in unit of 1 byte.

As can be understood from this figure, as the pulse width is narrowed, a higher recording power is required. For a large pulse width such as 1T, the recording power region having a low error rate is narrow, and also the best error rate itself is high as compared to those of other pulse widths. This is because when a recording is carried out with an excessively large pulse width, the diameter of each recording pit is rendered so large that pits adjacent to each other cannot be sufficiently separated. Thus, a write error is likely to occur.

FIG. 3 is a graph showing the results of a similar measurement carried out in the outermost track. Since the radius of this track is larger than the above case, the linear velocity (angular speed) is accordingly higher. Therefore, as compared to FIG. 2, the necessary recording power is shifted to the high power side and the minimum error rate value for the large pulse width of 1T is rendered sufficiently low. This is because the clock frequency (recording frequency) is constant over the entire surface of a disk in the CAV recording carried out in conformity to the ISO standard, the interval between pits is sufficiently large in the periphery portion.

Thus, in the CAV recording, it is not necessary to use a recording beam pulse having a short pulse width of about 0.75 T except for in the innermost track; however, rather, in order to avoid a high recording power being required along with a circumferential speed increased in the peripheral portion, the pulse width of the laser beam is varied in several steps according to the radius position of the track, as shown in FIG. 4. With this recording method, a high-quality recording of data can be performed on the entire surface of a disk.

The above-described technique of varying the pulse width in accordance with the radius position, used in the CAV recording is known and disclosed in, for example, Japanese Patent Publication (KOKAI) 59-24452. In this document, a recording laser pulse modulated (MFM modulation) in accordance with recording data is supplied to a laser drive circuit via a pulse width control circuit. Specifically, the pulse width control circuit comprises a plurality of pulse width conversion circuits having a predetermined period of time for narrowing or expanding a pulse width (for example, a known circuit formed by combining a delay circuit and AND gate or OR gate), and a decoder for converting the data of a radius position into control data used to select one of the plurality of the pulse width conversion circuits.

In this prior art example, there must be provided the same number of pulse width conversion circuits as the number of pulse widths involved. Therefore, in order to achieve a finer control, the circuit structure is rendered accordingly larger. As a result, the size of the overall apparatus is made large, and the production cost becomes high.

Meanwhile, in the CAV recording, the interval between adjacent pits is rendered excessively large as the location of the track becomes closer to the periphery, thus creating an unnecessary recording region. To avoid this, another recording mode is proposed to be used in practice, that is, the pit interval is reduced in outer tracks so as to make the pit interval constant over the entire surface of a disk. Such a recording mode is called ZCAV (Zoned Constant Angular Velocity) recording, and able to achieve a recording of a higher density than that of the Cav recording. In the ZCAV recording, the recording tracks are divided by their radii into a plurality of doughnut-like zones, and the reference clock frequency is switched from one zone to another such that the pit interval is rendered up to its physical limitation (which is substantially the same as the spot diameter determined by the diffraction limit of the concentrated laser beam) in each zone.

FIG. 5 is a table showing values of the reference clock frequency (MHz), 1T (T=1/reference clock frequency), 0.5 T and 0.75T in each zone (zone number, the radius of the innermost track, and that of the outermost track of the zone) of Standard ECMA-184 when rotated at a speed of 1800 rpm, as an example of the ZCAV standard for a disk of 130 mm. As can be understood from the table of this example, the recording density can be increased over the entire surface of a disk and a high-density recording can be achieved by increasing the clock frequency as the location of the zone becomes closer to the periphery.

Also in the ZCAV recording, a pulse width of about 0.75 T should be used in all zones in order to obtain a good byte-error rate in each zone. However, in the ZCAV recording, different reference clock frequencies (1/T) are used in the zones, and therefore in order to generate a pulse of the pulse width of 0.75 T in each zone, the width of the recording pulse must be changed from one zone to another as shown in FIG. 6.

For generating recording pulses having a plurality of pulse widths as above, usually, a delay circuit formed of delay lines and the like is used, as set forth in the above Japanese Patent Publication. FIG. 7 is a block diagram showing an example of the structure of a magneto-optical recording apparatus which can realize the just-mentioned operation.

The magneto-optical recording apparatus includes a controller 11, an SCSI (small computer system interface) interface circuit 12, a recording data pattern generating circuit 13, a reference clock generating circuit 14, a recording pulse generating circuit 15, a laser driver circuit 16 and a laser diode 17.

Data to be recorded, which is output from an external host computer (not shown) is fetched in the SCSI interface circuit 12 under the control of the controller 11, and then input to the recording pattern generating circuit 13. The recording data pattern generating circuit 13 generates a recording data pattern corresponding to the recording data input, and the recording data pattern is output synchronously with the reference clock output by the reference clock generating circuit 14. The reference clock generating circuit 14 generates a reference clock signal whose frequency is set in accordance with a zone being used in recording (zone determined based on the track to which the pick up is set), based on the instruction from the controller 11.

Thus, the recording data pattern which is in synchronous with the reference clock having a predetermined frequency corresponding to a particular zone is input to the recording pulse generating circuit 15. The recording pulse generating circuit 15 includes a flip-flop circuit 15a, a delay circuit 15b formed of delay lines, and a switch 15c formed of analog switches and the like. When a recording data pattern is input, the flip-flop 15a is set at the leading edge of the recording data pattern. The recording data pattern is input also to the delay circuit 15b. The delay circuit 15b has the same number of taps as that of the zones, and each of the taps outputs a signal having a different delay time one from another. The delay time corresponds to 0.75 T of each zone. An output from the delay circuit 15b which corresponds to a recording zone is selected by the switch 15c, and input to the flip-flop 15a as a reset signal. Thus, obtained from the flip-flop 15a, is a recording pulse having a pulse width whose timing corresponding to the delay time given by the delay circuit 15b to a signal selected by the switch 15c using the leading edge of a recording data pattern.

Based on the recording pulse thus generated, the laser diode 17 is turned on pulsewise by the laser drive circuit 16.

According to the above-described structure, the delay time of a signal output from each of the taps of the delay circuit 15b is set at the timing corresponding to 0.75 T of each zone, and therefore a recording can be performed in each zone by using a recording laser pulse whose pulse width is 0.75 T.

However, in order to apply the above-described structure to the ZCAV disk, the same number of taps as that of the zone must be provided on the delay circuit 15b. Usually, there are several tens of zones (as the radius of a disk expands, the number of zones increases), and therefore the structure of the delay circuit 15b is rendered complicated. Further, since one of the outputs of the taps must be selected by the switch 15c, the structure of the switch 15c is also rendered complex. The switching control must be provided for the selection of an output, and the structure becomes more complicated due to the additional structure (not shown) for the control.

As described above, according to the conventional technique, the ZCAV recording by means of a magneto-optical disk entails the following drawback. When the recording pulse width is varied so that data can be recorded with the recording pulse having the optimum pulse width in any of the zones, recording pulses of several different pulse widths must be prepared in advance, and an arbitrary one of the recording pulses is selected for use. However, with such a structure, all of the recording pulse of the different pulse widths must be generated at all times, resulting in a complicated structure.

SUMMARY OF THE INVENTION

Accordingly, it is an object of the present invention to provide an optical recording apparatus capable of generating a recording pulse of only a necessary pulse width by means of a simple structure.

Another object of the present invention is to provide an optical recording apparatus capable of performing a high-quality recording by using a recording pulse of a pulse width optimum for each of zones of a ZCAV magneto-optical disk.

According to the present invention, there is provided an apparatus for recording data on a track of an optical disk in accordance with a reference clock having a frequency corresponding to a radius of the track, the apparatus comprising:

means for generating a first pulse having a predetermined pulse width in synchronous with the reference clock;

means for generating a second pulse having a pulse width different from the pulse width of the first pulse;

means for generating a recording pulse based on the first pulse and the second pulse; and means for recording the data on the optical disk in accordance with the recording pulse.

According to the present invention, there is provided another apparatus for recording data on a track of an optical disk in accordance with a reference clock having a frequency corresponding to a radius of the track, the apparatus comprising:

frequency multiplying means for multiplying the reference clock;

logic circuit means for outputting a recording pulse having a pulse width at a given ratio of one period of the reference clock by performing a logical operation of an output from the frequency multiplying means and the reference clock; and means for recording the data on the optical disk in accordance with the recording pulse.

According to the present invention, there is provided still another apparatus for recording data on a track of an optical disk in accordance with a reference clock having a frequency corresponding to a radius of the track, the apparatus comprising:

means for outputting a first pulse having a constant pulse width in synchronous with the reference clock;

means for outputting a recording pulse by sequentially outputting the reference clock and the first pulse; and means for recording the data on the optical disk in accordance with the recording pulse.

According to the present invention, there is provided further apparatus for recording data on a track of an optical disk in accordance with a reference clock having a frequency corresponding to a radius of the track, the apparatus comprising:

means for generating a recording data pattern signal which indicates the data to be recorded, in synchronous with the reference clock;

means for generating a first pulse having a certain pulse width in synchronous with the recording data pattern signal;

means for outputting a recording pulse by selecting one of the recording data pattern signal and the first pulse in accordance with the radius of the track; and means for recording the data on the optical disk in accordance with the recording pulse.

According to the present invention, there is provided still further apparatus for recording data on a track of an optical disk in accordance with a reference clock having a frequency corresponding to a radius of the track, the apparatus comprising:

frequency multiplying means for multiplying the reference clock;

logic circuit means for outputting a first pulse having a pulse width at a given ratio of one period of the reference clock by performing a logical operation of an output from the frequency multiplying means and the reference clock;

means for generating a recording data pattern signal which indicates the data to be recorded, in synchronous with the reference clock;

means for outputting a second pulse having a certain pulse width in synchronous with the recording data pattern signal;

means for outputting a third pulse having a certain pulse width in synchronous with the first pulse;

means for outputting a recording pulse by selecting one of the recording data pattern signal, the first pulse, and a sum of the first and second pulses in accordance with the location of the track in terms of the radial direction thereof; and means for recording the data in accordance with the recording pulse.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 9A–9E are diagrams showing the timing charts of the first embodiment;

FIG. 10 is a diagram showing the relationship between the pulse width of the recording pulse and the recording power during a recording of the first embodiment;

FIGS. 12A–12E are diagrams showing the timing charts of the second embodiment;

FIG. 13 is a diagram showing the relationship between the pulse width of the recording pulse and the recording power during a recording of the second embodiment;

FIGS. 15A–15D are diagrams showing the timing charts of the third embodiment;

FIG. 16 is a diagram showing pulse widths of recording pulses corresponding to zones during a recording of the third embodiment;

FIG. 18 is a table showings reference clock frequencies used for each zone in the fourth embodiment;

FIG. 19 is a diagram showing pulse widths of recording pulses corresponding to zones during a recording of the fourth embodiment; and FIGS. 20A–20I are signal waveform diagrams illustrating the operation of the fourth embodiment.

DETAILED DESCRIPTION OF THE PREFERRED EMBODIMENT

A preferred embodiment of an optical disk recording apparatus according to the present invention will now be described with reference to the accompanying drawings. Hereinbelow, a magneto-optical recording apparatus is described as an example of the optical disk recording apparatus.

FIRST EMBODIMENT

Figure 7:
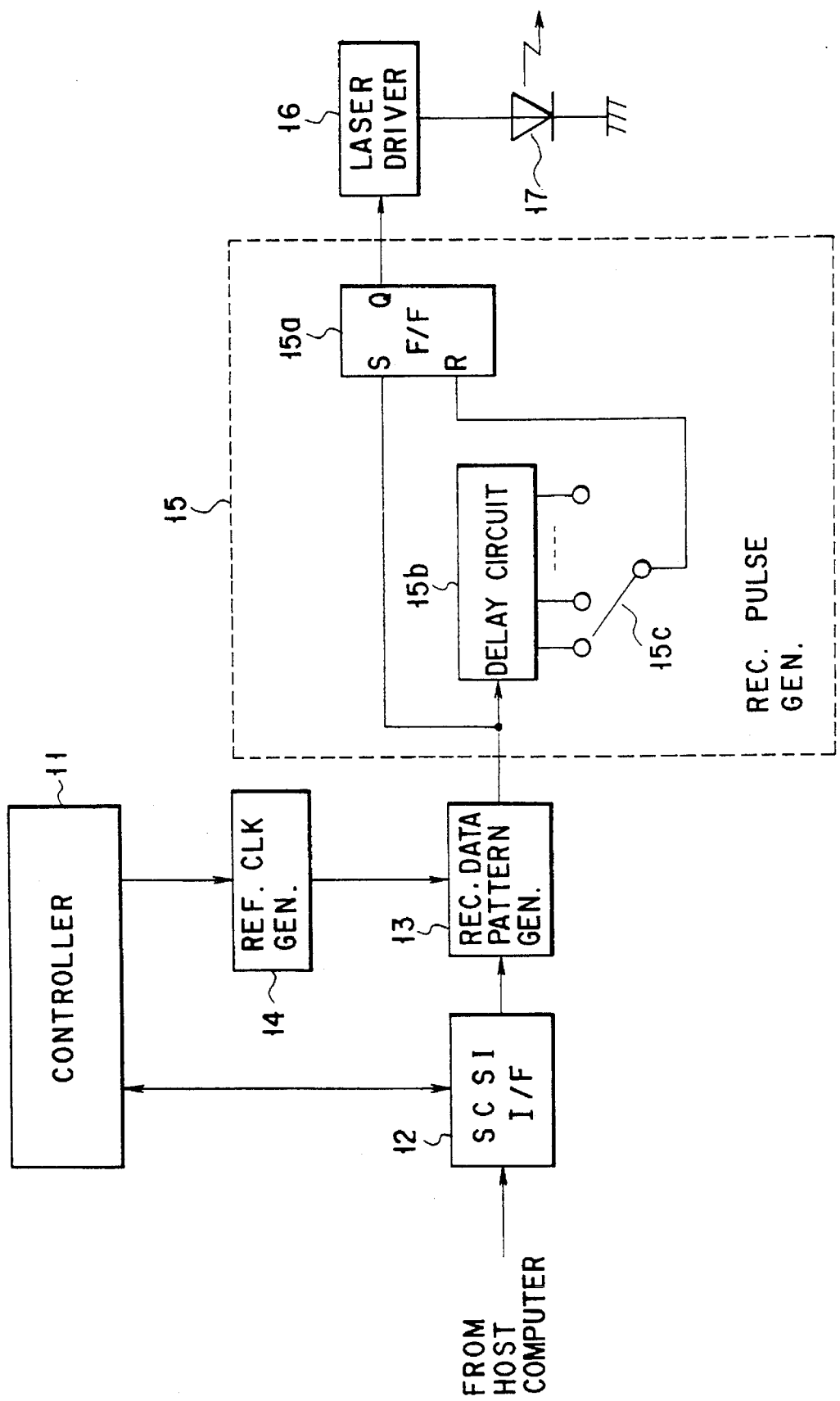
FIG. 7 is a block circuit diagram of a conventional magneto-optical recording apparatus which generates a recording laser pulse in the ZCAV recording.
Figure 8:
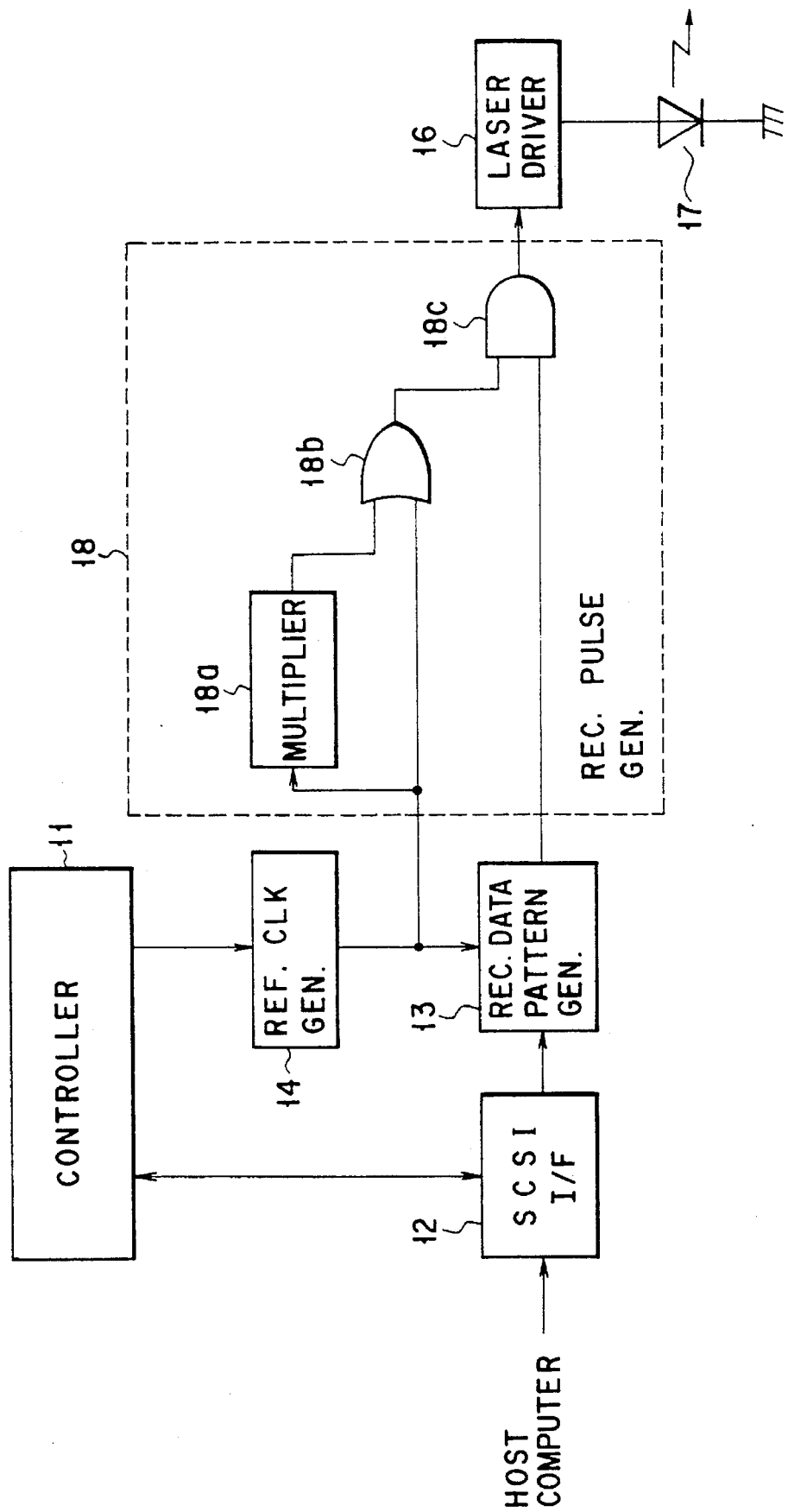
FIG. 8 is a block circuit diagram of a magneto-optical recording apparatus according to a first embodiment of the present invention.

FIG. 8 is a block diagram showing a structure of the main portion of a magneto-optical recording apparatus according to the first embodiment of the present invention. Similar elements to those shown in FIG. 7 will be designated by the same reference numerals.

This magneto-optical recording apparatus includes a controller 11, an SCSI interface circuit 12, a recording data pattern generating circuit 13, a reference clock generating circuit 14, a laser driver circuit 16, a laser diode 17 and a recording pulse generating circuit 18.

The controller 11 has a microprocessor as its main portion, and performs a well-known general control in a magneto-optical recording device, for example, the movement control of pick-up including the laser diode 17. The controller 11 also controls the input/output of data in the SCSI interface circuit 12, and performs the control for changing the frequency of the reference clock generated from the reference clock generating circuit 14 in accordance with a zone so as to carry out a ZCAV recording.

The SCSI interface circuit 12 performs the input/output of various types of data with respect to an external host computer (not shown) connected to the recording apparatus.

The recording data pattern generating circuit 13 generates a recording data pattern corresponding to recording data given from the SCSI interface circuit 12, and outputs this recording data pattern after synchronizing it with the reference clock output from the reference clock generation circuit 14.

The reference clock generating circuit 14 generates a reference clock signal having a frequency which is in accordance with the zone used in the recording, based on the instruction given from the controller 11.

The laser driver circuit 16 turns on the laser diode 17 pulsewise, based on a recording pulse generated by the recording pulse generating circuit 18.

The recording pulse generating circuit 18 is formed of a frequency multiplier circuit 18a, an OR gate 18b and an AND gate 18c.

A reference clock generated by the reference clock generating circuit 14 is input to the multiplier circuit 18a, where the reference clock is multiplied by two and a multiplied clock having a double frequency of the reference clock frequency is output therefrom.

Both the reference clock generated by the reference clock generating circuit 14 and the multiplied clock generated by the multiplier circuit 18a are input to the OR gate 18b, where the logical sum of the reference clock and the multiplied clock is obtained, and generated as a gate signal.

Both the recording data pattern generated by the recording data pattern generating circuit 13 and the gate signal output from the OR gate 18b are input to the AND gate 18c, where the recording data pattern is allowed to pass only while the gate signal is at the "1" level (i.e. high level of a binary signal). An output from the gate 18c is supplied as a recording pulse to the laser driver circuit 16.

The operation of the magneto-optical recording apparatus according to the first embodiment having the above-described structure will now be described.

Data to be recorded output from the external host computer is fetched in the SCSI interface circuit 12 under the control of the controller 11, and then supplied to the recording pattern generating circuit 13. The recording data pattern generating circuit 13 generates a recording data pattern corresponding to the recording data supplied, and the recording data pattern is synchronized with the reference clock output by the reference clock generating circuit 14, to be output to the recording pulse generating circuit 18.

In the recording pulse generating circuit 18, the logical sum of the reference clock (FIG. 9A) and the multiplied clock (FIG. 9B) obtained by multiplying the reference clock by two in the multiplier circuit 18a and having a double frequency of that of the reference clock, is obtained. Therefore, the gate signal whose level is at the "1" level from its leading edge over a period of ¾ of a period T of the reference clock, as shown in FIG. 9C, that is, the gate signal whose duty of pulse is 75% (0.75 T) is output from the OR gate 18b.

In the meantime, the recording data pattern (FIG. 9D) output from the recording data pattern generating circuit 13 is input to the AND gate 18c. The AND gate 18c is turned ON/OFF by the gate signal (FIG. 9C) output from the OR gate 18b. Therefore, only while the gate signal output from the OR gate 18b is at the "1" level, the recording data pattern is allowed to pass the AND gate 18c, and output to the laser driver 16 as a recording pulse as shown in FIG. 9E. Specifically, supposing that the recording data pattern is "10010 . . . " as shown in FIG. 9D, a recording pulse of 0.75 T is generated during the period when the data pattern is at the "1" level (period ta and period tb).

It should be noted that the frequency of the reference clock is changed in accordance with the position of the zone used for recording, and therefore the value of T is also varied in accordance with the zone. However, the multiplier circuit 18a passively processes a reference clock input. Consequently, when the frequency of an input is changed, the multiplier circuit 18a accordingly outputs a multiplied signal having a double frequency of the changed frequency. Therefore, regardless of the value of T, the signals in the recording pulse generating circuit 18 are always related to each other as shown in FIGS. 9A–9E, and a recording pulse of 0.75 T is always output.

Figure 1:
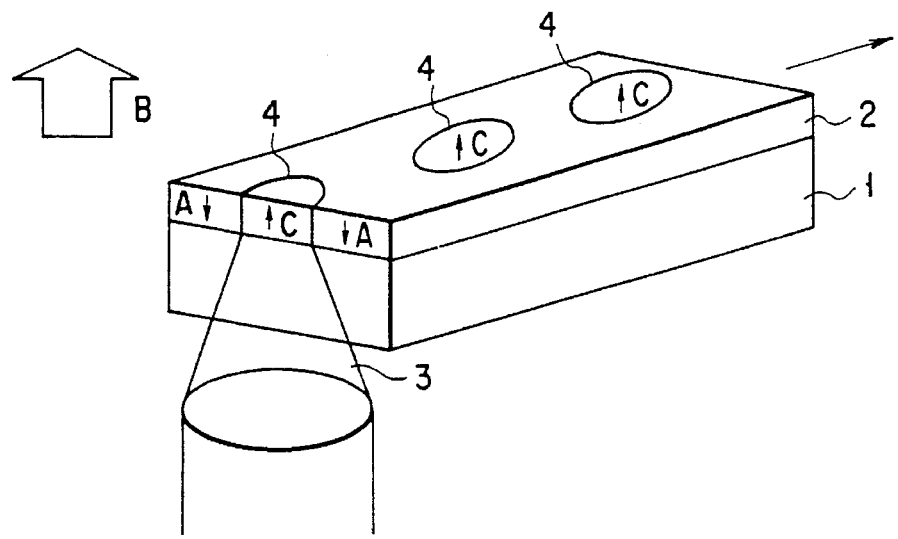
FIG. 1 is a diagram illustrating the principle of a recording on a magneto-optical disk.
Figure 2:
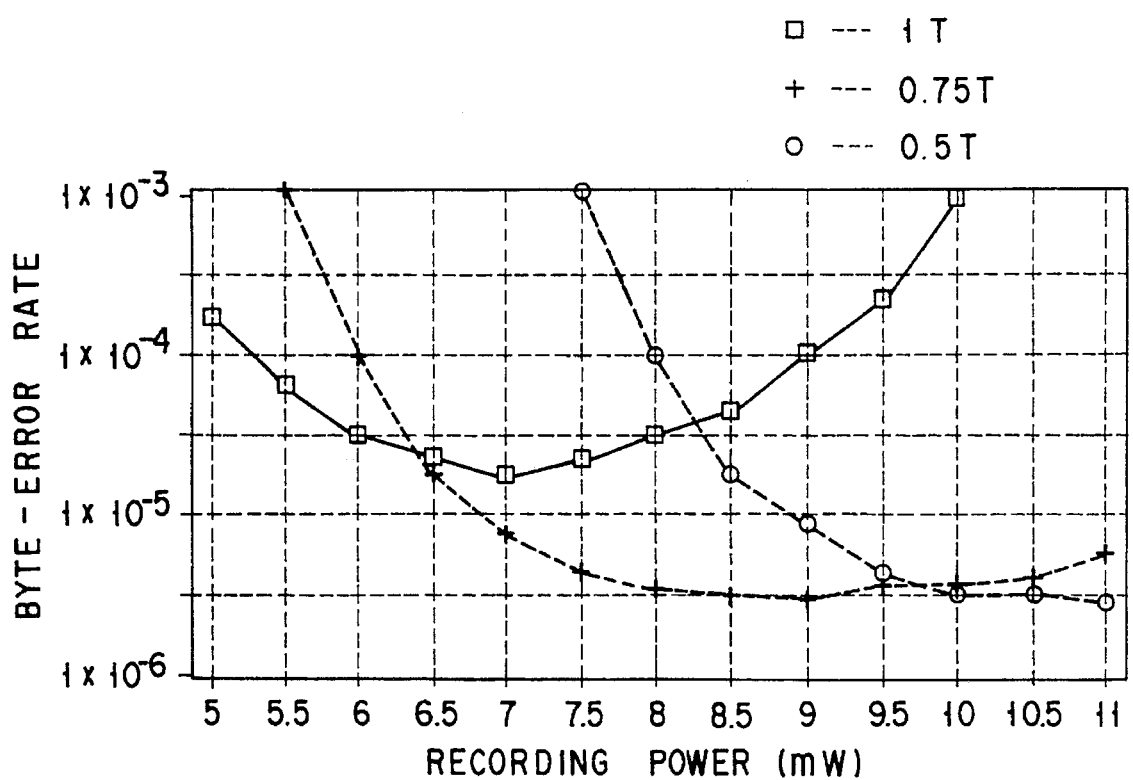
FIG. 2 is a graph showing the relationship between the recording powers of various pulse width used in the recording on the innermost track and the byte-error rate in the CAV recording.
Figure 3:
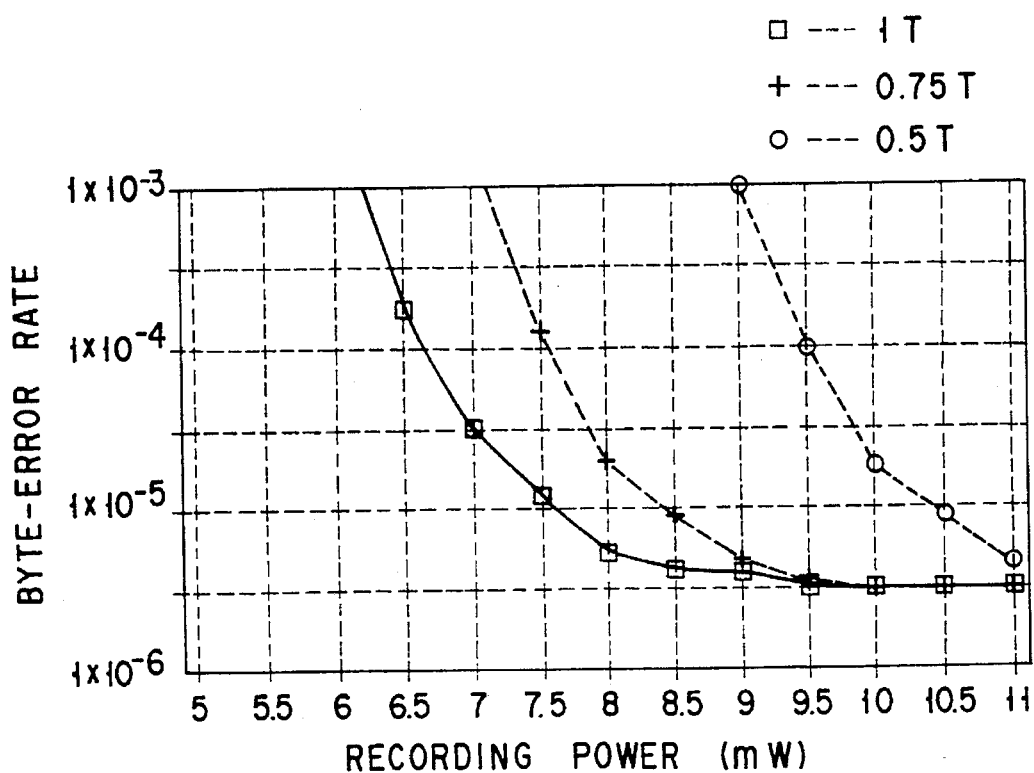
FIG. 3 is a graph showing the relationship between the recording powers of various pulse width used in the recording on the outermost track and the byte-error rate in the CAV recording.
Figure 4:
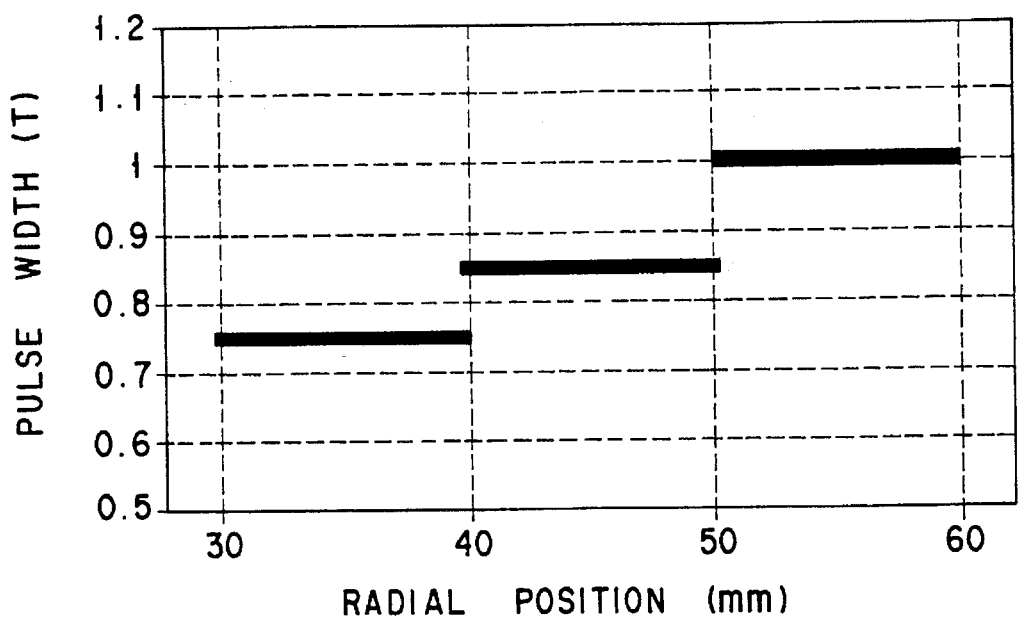
FIG. 4 is a graph showing recording pulse widths corresponding to radial positions of a disk in the ZCAV recording.

A recording pulse thus generated is input to the laser driver circuit 16. The laser driver circuit 16 drives the laser diode 17 while the recording pulse is applied, thereby turning on the laser diode 17 pulsewise. Thus, a magnetization reversal domain is formed on an magneto-optical disk as shown in FIG. 1.

FIG. 10 is a graph plotting the pulse width of the recording pulse and the recording power used in each zone during a recording by means of the magneto-optical recording apparatus of the present embodiment, using a disk having a radius of 130 mm in conformity to the ZCAV standard, being rotated at a speed of 1800 rpm.

As is clear from this figure, the pulse width is 0.75 T in all zones. In a recording with a constant pulse duty as this, the recording power optimum for the recording varies in proportional to the radius of the zone for recording. Since the recording power varies in a linear manner, the recording power in each zone can be easily calculated out and set. In particular, when the recording powers of the innermost and the outermost zones are determined by a trial write, the recording powers of the other zones intermediately located can be determined easily from a simple linear interpolation.

As described, according to the first embodiment, a ZCAV recording is realized with use of various frequencies of reference clocks, which are respectively optimum for zones, and the recording can be performed by using a pulse having a width of 0.75 T in each zone. Therefore, a very high-quality recording can be achieved. In addition to the achievement of the very high-quality recording, the present embodiment provides the following advantage. That is, the recording pulse generating circuit 18 multiplies the reference clock by two in the multiplier circuit 18a so as to form a pulse having a pulse width of 0.25 T. Since the pulse having a pulse width of 0.75 T is obtained by synthesizing this pulse with the pulse of the reference clock, which has a width of 0.5 T, a recording pulse having a width of 0.75 T can be always formed regardless of the value of T (reciprocal number of the reference clock frequency). Therefore, it is not necessary to select one of pulses having different pulse widths and generated at the same time, and the embodiment can be constituted by very simple circuits. Further, the operation is passive in accordance with the variation of the reference frequency, and the pulse width of a generated recording pulse is varied, thereby always obtaining a recording pulse having a width of 0.75 T. Consequently, there is no need to perform a switching control, enabling to perform a ZCAV recording by a simple structure.

It should be noted that the pulse width used in the first embodiment is not limited to 0.75 T, but a recording pulse of an arbitrary pulse width can be formed by combining the reference clock with a pulse whose width was multiplied by an arbitrary number. For example, a recording pulse of 0.625 T can be obtained by combining the reference clock with the reference clock pulse which was multiplied by 4, and further, a recording pulse of 0.875 T can be obtained by combining a pulse of 0.75 T with a pulse which was multiplied by 4.

SECOND EMBODIMENT

Figure 11:
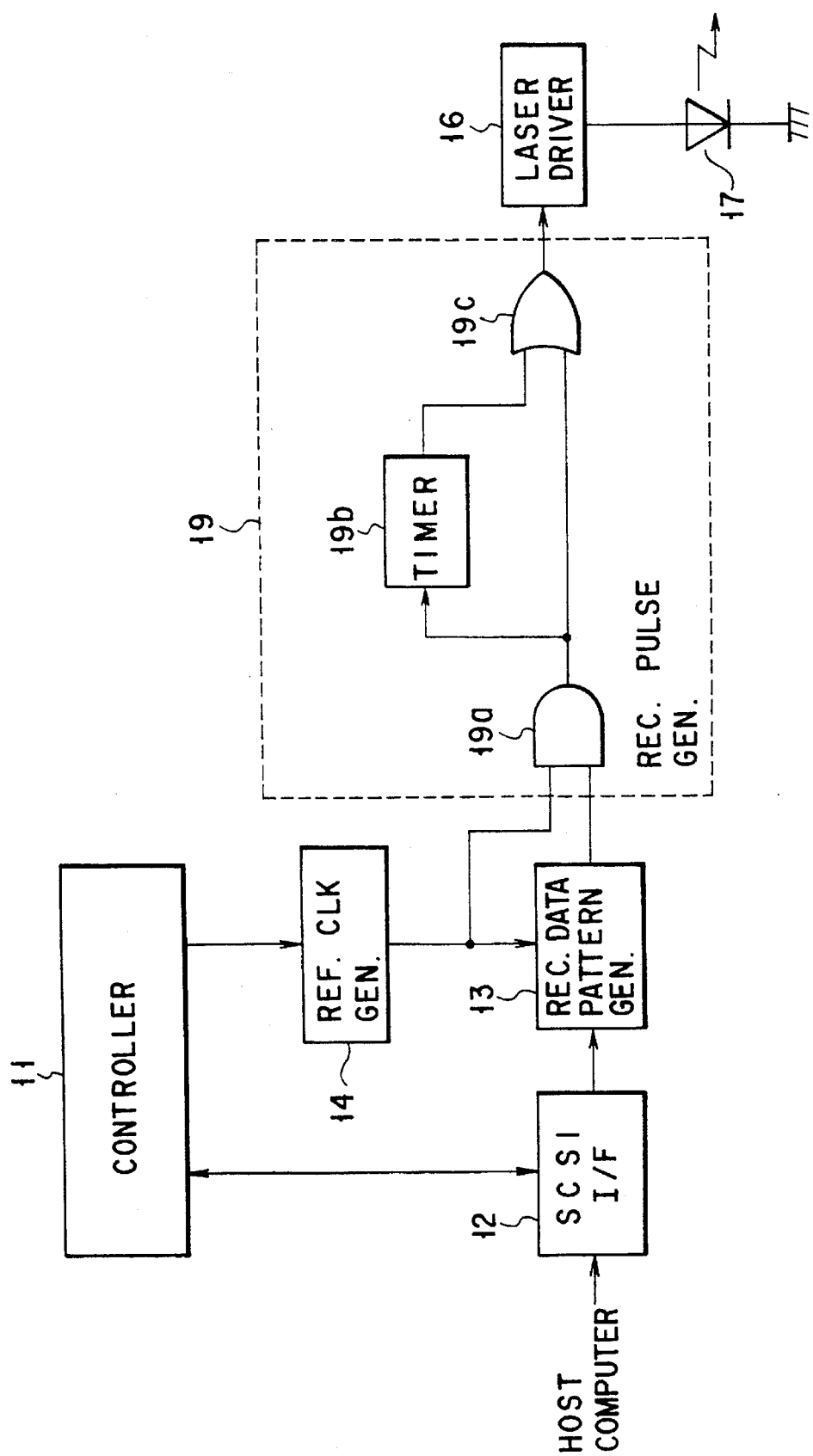
FIG. 11 is a block circuit diagram of a magneto-optical recording apparatus according to a second embodiment.

FIG. 11 is a block diagram showing a structure of the main portion of a magneto-optical recording apparatus according to the second embodiment of the present invention. Similar elements to those shown in FIG. 7 will be designated by the same reference numerals.

This magneto-optical recording apparatus includes a controller 11, an SCSI interface circuit 12, a recording data pattern generating circuit 13, a reference clock generating circuit 14, a laser driver circuit 16, a laser diode 17 and a recording pulse generating circuit 19.

This recording pulse generating circuit 19 comprises an AND gate 19a, a timer circuit 19b and an OR gate 19c.

Both a recording data pattern output from the recording data pattern generating circuit 13 and the reference clock generated from the reference clock generating circuit 14 are input to the AND gate 19a, where the logical product of the recording data pattern and the reference clock is obtained.

The timer circuit 19b starts a timer operation in synchronous with the trailing edge of an output from the AND gate 19a, and times a predetermined time period Δ. The timer circuit 19b outputs a signal of the "1" level while timing the predetermined time period Δ.

Both the output from the AND gate 19a and the output from the timer circuit 19b are input to the OR gate 19c, where the logical sum of both signals is obtained to produce a recording pulse.

The operation of the magneto-optical recording apparatus according to the second embodiment having the above-described structure will now be described.

Data to be recorded output from the external host computer is fetched in the SCSI interface circuit 12 under the control of the controller 11, and then supplied to the recording pattern generating circuit 13. The recording data pattern generating circuit 13 generates a recording data pattern (FIG. 12B) corresponding to the recording data supplied, and the recording data pattern is synchronized with the reference clock (FIG. 12A) output by the reference clock generating circuit 14, to be output to the recording pulse generating circuit 19.

In the recording pulse generating circuit 19, the logical sum of the recording data pattern (FIG. 12B) and the reference clock (FIG. 12A) are obtained by the AND gate 19a, thus producing a signal having a pulse width of 0.5 T in synchronous with the leading edge of a pulse corresponding to data "1" of the recording data pattern as shown in FIG. 12C. This signal is input to both the timer circuit 19b and the OR gate 19c.

The timer circuit 19b starts a timer operation in synchronous with the trailing edge of the output (FIG. 12C) from the AND gate 19a mentioned above, and set the output to the "1" level over a predetermined time period Δ. Consequently, a pulse having a pulse width Δ is produced from the timer circuit 19b in synchronous with the trailing edge of the pulse (FIG. 12C) output from the AND gate 19a as shown in FIG. 12D.

The logical sum of the output from the timer circuit 19b and the output from the AND gate 19a is obtained by the OR gate 19c. Thus, a pulse having a pulse width 0.5 T output from the AND gate 19a and a pulse having a pulse width A output from the timer circuit 19b are synthesized to produce a recording pulse having a pulse width (0.5 T+Δ) as shown in FIG. 12E.

The timer period A of the timer circuit 19b is always constant regardless of various frequencies of the reference clock. In this embodiment, the time Δ is set shorter than 0.5 T, which is the period of the reference clock in the outermost zone. If the time Δ is constant, the pulse width of the recording pulse varies along with the change in the frequency of the reference clock, and therefore it is rendered not possible to maintain a pulse width of 0.75 T in all zones. For example, a pulse having a fixed pulse width of Δ=14 nsec is added to a pulse width of 0.5 T in each zone, and therefore, in inner zones 0 to 5, the recording pulse width is narrower than 0.75 T, whereas in outer zones, the recording pulse width is larger than 0.75 T, with the pulse width of the outermost zone being about 0.86 T (See FIG. 5 for reference clock frequency of each zone).

However, for a recording density close to the most dense, an appropriate value for the recording pulse width is about 0.75 T. The angular speed becomes faster as the location of the zone becomes closer to the periphery of the disk, and therefore, in some case, it is possible to record data even it has a large pulse width (in some cases, a good error rate is obtained with a large pulse width for a certain disk characteristic, and a large pulse width is acceptable in such cases). Consequently, even if Δ is set at constant, there will be no problem as mentioned above.

The recording pulse thus generated is input to the laser driver circuit 16. The laser driver circuit 16 drives the laser diode 17 while the recording pulse is being supplied, so as to turn on the laser diode 17 pulsewise. Thus, a magnetization reversal domain such as shown in FIG. 1 is formed on a magneto-optical disk (not shown).

FIG. 13 is a diagram showing the relationship between the pulse width (0.5 T+Δ) of the recording pulse and the recording power used in each zone during a recording by means of the magneto-optical recording apparatus, along with a pulse width of 0.75 T for comparison. It is understood from this figure that the pulse width (0.5 T+Δ) of this embodiment is narrower than the pulse width (0.75 T) of the first embodiment in inner zones, and is rendered larger as the location of the zone becomes closer to the outer periphery. In this embodiment, the recording power for the outer zones is lower than that of the first embodiment since the pulse width of the recording pulse is larger than that of the first embodiment.

Further, since the difference between the inner and outer zones in recording power is small, a high accuracy in the recording power setting can be easily achieved. Also, in the case where a trial write is used, the error of the recording power setting based on an interpolation is very small.

As described, according to this embodiment, a ZCAV recording is realized with use of various frequencies of reference clocks, which are respectively optimum for zones, and at the same time, the recording can be conducted always by a pulse having an optimum width in each zone. Therefore, a very high-quality recording can be achieved. In addition to the achievement of the very high-quality recording, the present embodiment provides the following advantage. That is, the recording pulse generating circuit 19 gains the logical product of the recording data pattern and the reference clock so as to make the pulse width of the pulse in the recording data pattern, 0.5 T. Since the recording pulse having a pulse width (0.5 T+Δ) is obtained by adding the pulse having a pulse width Δ, generated by the timer circuit 19b to the above-obtained 0.5 T pulse, a recording pulse having an optimum width can be always formed regardless of the value of T. Therefore, it is not necessary to select one of pulses having different pulse widths and generated at the same time, and the embodiment can be constituted by very simple circuits. Further, the operation is passive in accordance with the variation of the reference frequency, and the pulse width of a generated recording pulse is varied, thereby always obtaining a recording pulse having an optimum width. Consequently, there is no need to perform a switching control.

THIRD EMBODIMENT

Figure 14:
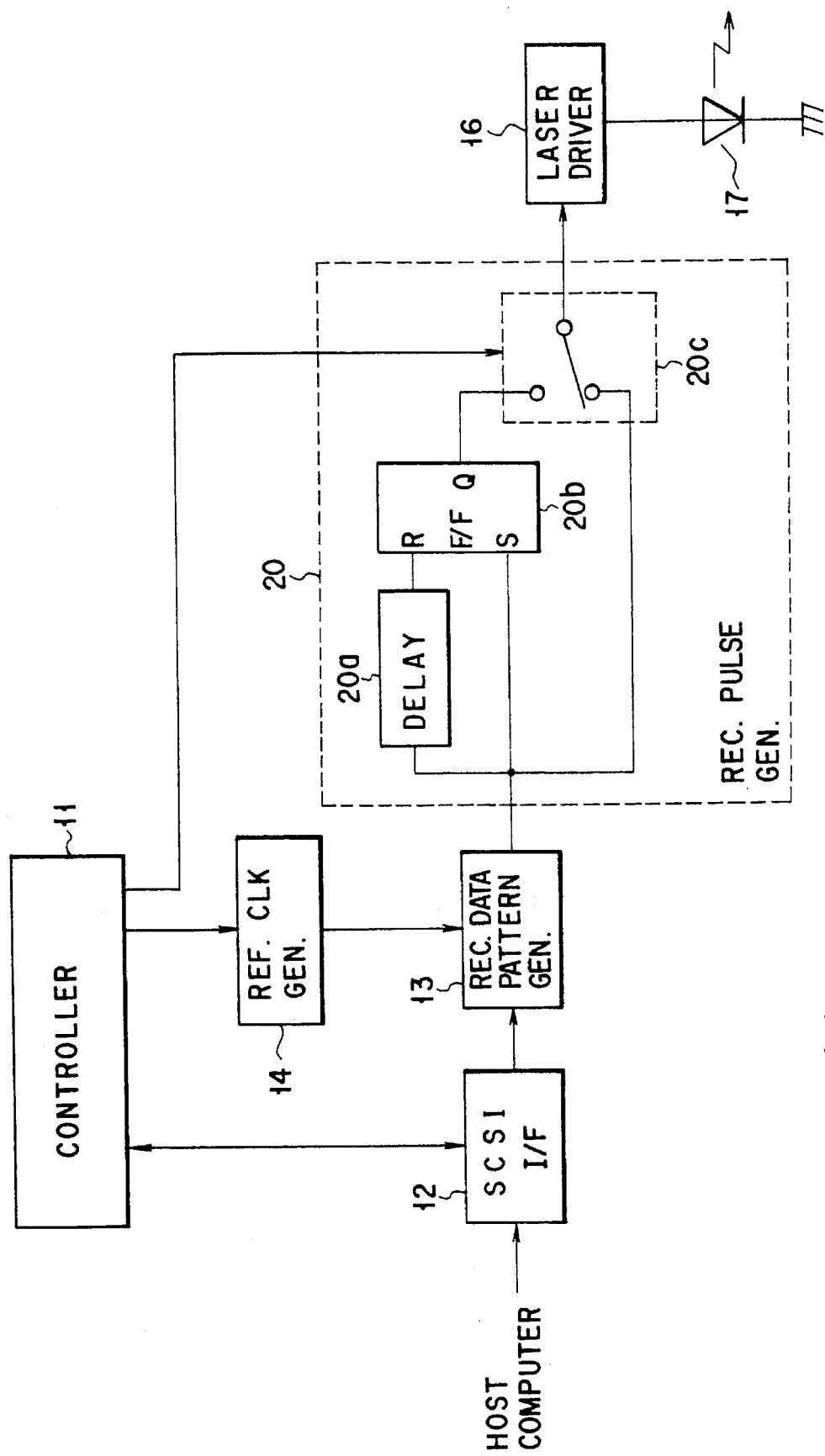
FIG. 14 is a block circuit diagram of a magneto-optical recording apparatus according to a third embodiment.

FIG. 14 is a block diagram showing a structure of the main portion of a magneto-optical recording apparatus according to the third embodiment of the present invention. Similar elements to those shown in FIG. 7 will be designated by the same reference numerals.

This magneto-optical recording apparatus includes a controller 11, an SCSI interface circuit 12, a recording data pattern generating circuit 13, a reference clock generating circuit 14, a laser driver circuit 16, a laser diode 17 and a recording pulse generating circuit 20.

This recording pulse generating circuit 20 comprises a delay circuit 20a, a flip-flop 20b and a selector 20c.

A recording data pattern output from the recording data pattern generating circuit 20 is supplied to a set terminal S of the flip-flop 20b, and to the delay circuit 20a. The delay circuit 20a delays this recording data pattern by a certain time τ, and outputs to a reset terminal R of the flip-flop 20b. Then, the output signal from the flip-flop 20b and the recording data pattern output from the recording data pattern generating circuit 13 are supplied to a selector 20c, where one of these output signals is selected in accordance with a selection signal from the controller 11, thus forming a recording pulse.

The operation of a magneto-optical recording apparatus according to the third embodiment having the above-described structure will be described.

Data to be recorded output from the external host computer is fetched in the SCSI interface circuit 12 under the control of the controller 11, and then supplied to the recording data pattern generating circuit 13. The recording data pattern generating circuit 13 generates a recording data pattern (FIG. 15B) corresponding to the supplied data. The recording data pattern is synchronized with the reference clock (FIG. 15A) output from the reference clock generating circuit 14, and output to the recording pulse generation circuit 19.

In the recording pulse generating circuit 19, the delay circuit 20a delays the recording data pattern signal by a predetermined time τ, and outputs a signal shown in FIG. 15C. The flip-flop 20b is set in accordance with the recording data pattern signal, and reset by the output from the delay circuit 20a. Therefore, the flip-flop 20b outputs a pulse having a pulse width of τ in synchronous with the leading edge of the recording data pattern signal, as shown in FIG. 15D. The selector 20c outputs either one of the recording pulse which is the recording data pattern (pulse width of T) itself shown in FIG. 15B, and the recording pulse having a pulse width of τ shown in FIG. 15D.

Figures 5, 6:
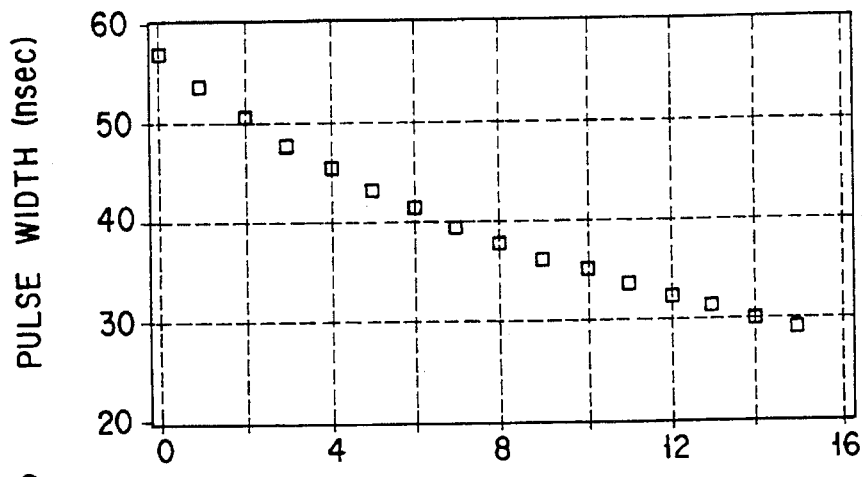
FIG. 5 is a table showing reference clock frequencies used for each zone in the ZCAV recording.
FIG. 6 is a graph showing recording pulse widths corresponding to zones in the ZCAV recording.

In this embodiment, the delay time τ of the delay circuit 20a is set at 50 nsec, and this value is equivalent to 0.66 T used in the innermost zone (zone 0) (See FIG. 5 for reference clock frequency of each zone).

The switching operation of the selector 20c will now be described. The controller 11 controls the switching of the selector 20c so that the output (pulse width of τ) of the flip-flop 20b is selected in the zones 0 to 8, whereas the recording data pattern signal (pulse width of T) is selected in zones 9 to 15, and the selected signal is sent as a recording pulse to the laser driver circuit 16. The laser driver circuit 16 drives and modulates the laser diode 17 in accordance with the laser diode light emission pulse. Specifically, a high-output pulse light-emission is performed at a timing corresponding to the "1" level in the data series, and a laser beam is irradiated on the magneto-optical disk to form a recording pit thereon. Thus, the signal is recorded.

FIG. 16 shows the recording pulse width used in each of the zones. The solid line in FIG. 16 indicates the pulse width of the third embodiment, and pulse widths of T and 0.75 T are also plotted for comparison. As can be seen in this figure, in the third embodiment, a recording pulse having a fixed pulse width (50 nsec), which is shorter than the period (T) of the frequency of the reference clock, is used in the zones 0 to 8, and a recording pulse having a width of T is used in the zones located in the outer side from the zone 9. As can be seen in FIG. 16, the recording pulse having a fixed width is used up to the zone 8 since 50 nsec is shorter than T, and the selector 20c is switched to use the recording pulse having a pulse width of T from the zone 9 outward, since T is shorter than 50 nsec in these zones.

In the innermost section of a disk, the angular speed is low, and therefore it is desirable to use a pulse having a recording pulse width of less than T, for example, 0.75 T or less, for a high-quality recording. In this embodiment, the pulse width is set at 0.66 T, and a sufficiently low error rate can be achieved, enabling a high-quality recording. With this fixed pulse width, the pulse duty is rendered relatively longer (about 0.75 T in zone 3) as the location of the zone becomes closer to the outer periphery. However, the angular speed is rendered faster, and therefore the thermal interference between adjacent pits during recording is made low, achieving a sufficiently low error rate. Further, in the zones located in the outer side of the zone 9 including the zone 9, the angular speed is further increased, and therefore a sufficiently low error rate can be achieved even if a recording pulse having a width of T is used.

As described above, according to the present embodiment, recording pulses having pulse widths necessary to perform a high-quality recording in all zones of a ZCAV disk can be obtained by a simple circuit structure comprising the delay circuit 20a having a single delay time, the flip-flop 20b and the selector 20c, and therefore a high-quality data recording with a sufficiently low error rate can be carried out. Therefore, it is not necessary to generate pulses having different pulse widths at the same time, and the embodiment can be constituted by very simple circuits. Further, the operation is passive in accordance with the variation of the reference frequency, and the pulse width of a generated recording pulse is varied, thereby always obtaining a recording pulse having an optimum width. Consequently, there is no need to perform a switching control.

FOURTH EMBODIMENT

Figure 17:
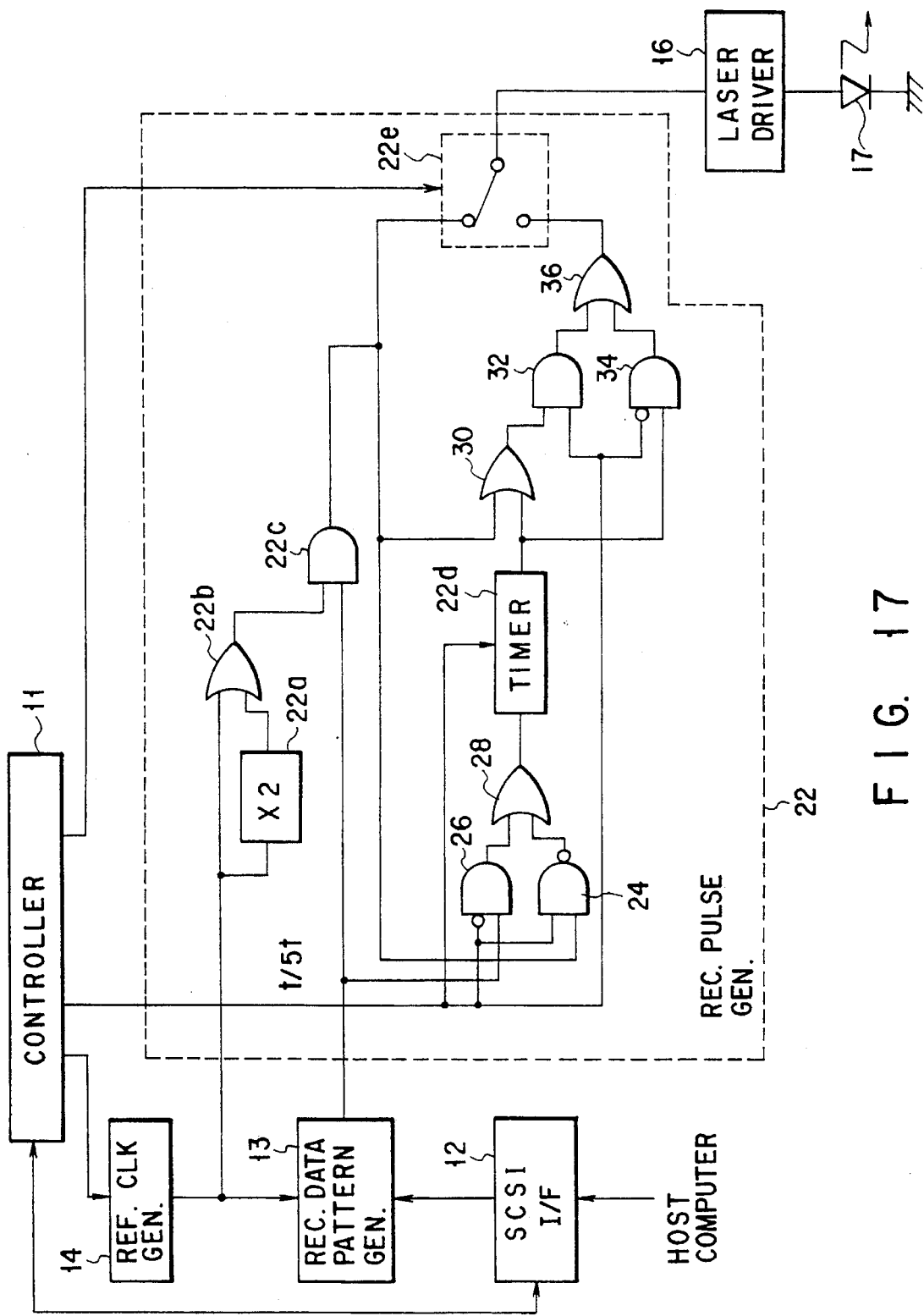
FIG. 17 is a block circuit diagram of a magneto-optical recording apparatus according to a fourth embodiment.

FIG. 17 is a block diagram showing a structure of the main portion of a magneto-optical recording apparatus according to the fourth embodiment of the present invention. Similar elements to those shown in FIG. 7 will be designated by the same reference numerals.

This magneto-optical recording apparatus includes a controller 11, an SCSI interface circuit 12, a recording data pattern generating circuit 13, a reference clock generating circuit 14, a laser driver circuit 16, a laser diode 17 and a recording pulse generating circuit 22.

This recording pulse generating circuit 22 comprises a frequency multiplier circuit 22a, an OR gate 22b, an AND gate 22c, a timer 22d and a selector 22e. The frequency multiplier circuit 22a, the OR gate 22b and the AND gate 22c are identical to the corresponding ones of the first embodiment shown in FIG. 8, and the AND gate 22c provides a recording pulse having a pulse width of 0.75 T.

The timer 22d starts the timer operation at the leading edge of an input signal, and times one of two different times t and 5t. During the timing period, the signal of the "1" level is output.

A pulse having a width of 0.75 T and output from the AND gate 22c is supplied to the first input terminal of the selector 22e and the first input terminal of the NAND gate 24. To the second input terminal of the NAND 24, a timer time control signal t/5t supplied from the controller 11 to the timer 22d is input. The timer time of the timer 22d is set at t when the control signal t/5t is at the "1" level, whereas the timer time is set at 5t when the signal is at the "0" level.

In the meantime, a recording data pattern signal output from the recording data pattern generating circuit 13 is supplied to the first input terminal of the AND gate 26, and an inverted signal of the timer time control signal t/5t output from the controller 11 is supplied to the second input terminal of the AND gate 26. Outputs from the NAND gate 24 and the AND gate 26 are input to the input terminal of the timer 22d via the OR gate 28.

An output from the timer 22d and an output from the AND gate 22c are supplied to the first input terminal of the AND gate 32 via the OR gate 30. The time control signal t/5t is supplied to the second input terminal of the AND gate 32. The output from the timer 22d and an inverted signal of the time control signal t/5t are supplied to the AND gate 34. Outputs from the AND gates 32 and 34 are supplied to the second input terminal of the selector 22e via the OR gate 36.

The operation of the fourth embodiment will be described. The disk used in this embodiment has the same diameter as that of the above-described embodiment; however is rotated at a different speed. In the above embodiment, the rotation speed was 1800 rpm, whereas in this embodiment, it is 3000 rpm. Therefore, the reference clock frequencies of the zones are as shown in FIG. 18, and different from those shown in FIG. 5. Note that the radii of the zones shown in FIG. 18 are the same as the corresponding ones shown in FIG. 5. The controller 11 switches the selector 22e to the first input terminal side (the output terminal of the AND gate 22c) for the zones 0 to 5, whereas to the second input terminal side (the output terminal of the OR gate 36) for the zones 6 to 15. Further, the controller 11 sets the timer time control signal t/5t at the "0" level for the zones 6 to 11, whereas sets the signal t/5t at the "1" level for the zones 12 to 15. Note that in this embodiment, t=5 nsec.

In the zones 0 to 5, a recording pulse having a pulse width of 0.75 T is generated synchronously with the leading edge of each recording data pattern signal as shown in FIGS. 9A to 9E in a similar manner to that of the first embodiment.

In the zones 6 to 11, the control signal t/5t is at the "0" level, and therefore the timer time of the timer 22d is set at 5t, and the AND gate 32 is turned off. Consequently, the AND gate 34 allows the output from the timer 22d to pass therethrough. Thus, the output signal (having a pulse width of 5t) from the timer 22d is directly supplied to the selector 22e.

As to the gates of the input side of the timer 22d, the AND gate 26 allows the recording data pattern signal to directly pass therethrough, and the NAND gate 24 is turned off. Consequently, the recording data pattern signal is supplied to the timer 22d. Accordingly, the timer 22d times 5t from the leading edge of the recording data pattern signal, and thus a recording pulse having a pulse width 5t is generated synchronously with the leading edge of the recording data pattern signal.

In the zones 12 to 15, the control signal t/5t is at the "1" level, and therefore the timer time of the timer 22d is set at t, and the AND gate 34 is turned off. Consequently, the AND gate 32 allows the pulse signal having a pulse signal of 0.75 T and the output (having a pulse width of t) from the timer 22d to pass therethrough.

As to the gates of the input side of the timer 22d, the NAND gate 24 outputs the inverted signal of a pulse signal having a width of 0.75 T, and the AND gate 26 is turned off. Consequently, the inverted signal of the 0.75 T pulse is supplied to the timer 22d. Accordingly, the timer 22d times t from the trailing edge of the 0.75 T pulse, and thus a recording pulse having a pulse width of 0.75 T+T is generated.

The pulse widths involved in the fourth embodiment are shown in the right column of the table shown in FIG. 18.

FIG. 19 is a graph showing the pulse width of a recording pulse used in each zone when a recording is performed by the magneto-optical recording apparatus according to this embodiment.

FIGS. 20A to 20I shows signal waveforms of the fourth embodiment when generating a recording pulse for each of zones 6 to 15. Since the waveforms for the zones 0 to 5 are the same as those of the first embodiment, they will not be illustrated.

As described in the second embodiment, the angular speed increases in outer periphery, and therefore a high-quality recording can be achieved even a large pulse width is used. Rather, a necessary laser power (wave height value) increases in the outer periphery if the same pulse width or the same duty ratio as of the inner side is used. In order to avoid this, the pulse width should preferably be increased, just because the angular speed becomes faster. An increment in the pulse 10 width is important particularly in the case where the rotation speed is high as in this embodiment. In the first embodiment, a recording pulse having a width of 0.75 T is used in all tracks, whereas in this embodiment, a pulse having a width obtained by adding t (=5 nsec) to 0.75 T is used in outer tracks, thus achieving a high-quality recording even if the laser power is rendered lower than that of the first embodiment.

The fourth embodiment can be modified as follows. That is, a pulse of a width of 0.5 T, instead of 0.75 T, is generated by a logic circuit, and t (5 nsec) and 2t are generated by a timer, so as to set the pulse width for the zones 0 to 5 at 0.5 T, the pulse width for the zones 6 to 10 at 0.5 T+t, and the pulse width for the zones 11 to 15 at 0.5 T+2t. In this modified version, the pulse width is increased as the location of the zone becomes closer to the outer periphery, and therefore the laser power used for recording can be reduced.

According to the fourth embodiment, first and second pulses having different pulse widths are generated from the timer 22d and a third pulse having a predetermined duty ratio (pulse width) is generated by multiplying the reference clock. Therefore, three recording pulses having a fixed pulse width and a pulse width corresponding to the reference clock frequency can be easily generated by selecting and/or synthesizing the first to third pulses.

According to the present invention, a recording pulse is generated by using a reference clock having a frequency which is in accordance with the location of a track, and therefore a recording pulse having a pulse width appropriate for the location of a track can be generated by a simple structure.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the above embodiments are recording apparatus which uses a magneto-optical disk, as an optical disk, but the present invention can be applied to other types of the optical disk on which a recording pit is formed (for example, phase variation disk) by allowing the laser diode to emit light pulsewise. Further, the numeral values for the diameter of the disk, rotation speed, reference clock frequency and the like are merely examples, and the present invention is not at all limited to those numeral values.

What is claimed is:

1. An apparatus for recording data on a track of an optical disk in accordance with a reference clock having a frequency corresponding to a radius of the track, the apparatus comprising:

means for generating a first pulse having a predetermined pulse width, in synchronism with said reference clock;

means for generating a second pulse having a pulse width different from the pulse width of said first pulse;

means for generating a recording pulse based on said first pulse and said second pulse such that said recording pulse has a pulse width which is a function of the pulse widths of said first and second pulses; and means for recording the data on the optical disk in accordance with said recording pulse.

2. An apparatus according to claim 1, wherein:

said first pulse generating means comprises frequency multiplying means for multiplying said reference clock by two;

said second pulse generating means comprises means for outputting said reference clock as said second pulse; and said recording pulse generating means comprises an OR gate for obtaining a logical sum of an output from said frequency multiplying means and said reference clock, means for generating a recording pattern signal which indicates data to be recorded, synchronous with the reference clock, and an AND gate for obtaining a logical product of said recording data pattern signal and an output from said OR gate as said recording pulse.

3. An apparatus according to claim 1, wherein:

said first pulse generating means comprises means for generating a recording pattern signal which indicates data to be recorded, synchronous with the reference clock, and an AND gate for obtaining a logical product of said recording data pattern signal and the reference clock as said first pulse;

said second pulse generating means comprises timer means for timing a given time period, in synchronous with a trailing edge of said first pulse and outputting a second pulse during a timing operation; and said recording pulse generating means comprises an OR gate for obtaining a logical sum of an output from said AND gate and an output from said timer means.

4. An apparatus according to claim 1, wherein:

said first pulse generating means comprises means for generating a recording pattern signal which indicates data to be recorded, as a first pulse synchronous with the reference clock;

said second pulse generating means comprises means for generating a second pulse having a pulse width shorter than one period of said reference clock, in synchronous with said first pulse; and said recording pulse generating means comprises selection means for outputting a recording pulse by selecting one of said first and second pulses in accordance with the radius of the track.

5. An apparatus according to claim 4, wherein said second pulse generating means comprises:

means for delaying said first pulse by a predetermined time; and a flip-flop which is set by said first pulse and reset in accordance with an output from said delay means.

6. An apparatus according to claim 4, wherein said selection means selects said second pulse for inner tracks and said first pulse for outer tracks.

7. An apparatus for recording data on a track of an optical disk in accordance with a reference clock having a variable frequency and a variable pulse width which correspond to a radius of the track, the apparatus comprising:

means for outputting a first pulse having a constant pulse width, in synchronism with said reference clock;

means for outputting a recording pulse by sequentially outputting said reference clock and said first pulse, the recording pulse having a pulse width obtained by adding the variable pulse width of the reference clock and the constant pulse width of the first pulse; and means for recording the data on the optical disk in accordance with said recording pulse.

8. An apparatus according to claim 7, wherein said first pulse outputting means comprises a timer for timing a predetermined time period from a trailing edge of said reference clock and outputting a signal of "1" level during a timing operation; and said recording pulse outputting means comprises an OR gate for outputting said recording pulse by obtaining a logical sum of said reference clock and an output from said timer.

9. An apparatus according to claim 8, wherein the predetermined time period timed by said timer is shorter than a pulse width of said reference clock.

* * * * *